US012370122B1

(12) United States Patent
Cun

(10) Patent No.: US 12,370,122 B1
(45) Date of Patent: Jul. 29, 2025

(54) MALE MASSAGER

(71) Applicant: Shenzhen Envision Technology Innovation Co., Ltd., Shenzhen (CN)

(72) Inventor: Lang Cun, Shenzhen (CN)

(73) Assignee: Shenzhen Envision Technology Innovation Co., Ltd., Shenzhen (CN)

( * ) Notice: Subject to any disclaimer, the term of this patent is extended or adjusted under 35 U.S.C. 154(b) by 0 days.

(21) Appl. No.: 18/899,551

(22) Filed: Sep. 27, 2024

(30) Foreign Application Priority Data

Jun. 5, 2024 (CN) ......................... 202421271782.8

(51) Int. Cl.
*A61H 19/00* (2006.01)

(52) U.S. Cl.
CPC ..... *A61H 19/32* (2013.01); *A61H 2201/0157* (2013.01); *A61H 2201/1215* (2013.01); *A61H 2201/1664* (2013.01)

(58) Field of Classification Search
CPC ........ A61H 19/00; A61H 19/30; A61H 19/32; A61H 19/34; A61H 19/40; A61H 19/44; A61H 19/50; A61H 1/02; A61H 2201/1664; A61H 23/0254
See application file for complete search history.

(56) References Cited

U.S. PATENT DOCUMENTS 6,074,617 A * 6/2000 DeYoung ............... G01N 35/04 422/65
11,730,665 B1 * 8/2023 Huang ................... A61H 23/02 600/38
11,737,949 B1 * 8/2023 Huang ................... A61H 19/32 600/38
2017/0340501 A1 * 11/2017 Lin ........................ A61H 19/30
2020/0253816 A1 * 8/2020 Sloan ................... H04N 21/242
2020/0375833 A1 * 12/2020 Patel .................... A61H 1/0277
2023/0126338 A1 * 4/2023 Shao .................. A61H 15/0078 600/38

FOREIGN PATENT DOCUMENTS

JP 2019005165 * 1/2019 ............. A61H 19/00

* cited by examiner

*Primary Examiner* — Victoria Murphy
*Assistant Examiner* — Savannah L Gabriel
(74) *Attorney, Agent, or Firm* — Yong Chen

(57) ABSTRACT

A massager includes a housing, a motor, a power transmission link (for example, a synchronous belt) operatively coupled to the motor, a transmission component having two arms and a bottom coupled to the synchronous belt, a massage sleeve disposed on an exterior side of the housing, and a massage sleeve holder engaging the massage sleeve. The massage sleeve holder includes two fixation fins each extending away from the massage sleeve holder and coupled to one arm of the transmission component. The motor, the power transmission link and the transmission component are disposed inside the housing. The massage sleeve is configured to be driven by the motor via the power transmission link and the transmission component to move linearly back and forth along a long axis relative to the housing.

12 Claims, 7 Drawing Sheets

MALE MASSAGER

TECHNICAL FIELD

This invention relates to the field of health care massage products, specifically to a penis massager.

BACKGROUND

A massager can be used to massage the entire body or specific parts of the body. By simulating hand massage techniques, a massager applies pressure and vibration to body parts to relax the muscle and alleviate fatigue. With the continuous improvement of modern living standards and advancement of people's lifestyles, the demand for and market of massagers are increasingly expanding and gaining acceptance among more people.

Traditional massagers, during use, often require the user to directly hold the housing of the massager. This is inconvenient and makes it easy for the massager to slip out of hand. Additionally, the massage components of the massager are usually located inside the shell, making it difficult for the operator to adjust the usage angle or method in real-time and not conducive to timely detecting operational issues.

There is a need for the continued development of massagers that are easier to use with improved functionality.

SUMMARY OF THE INVENTION

In one aspect, the present disclosure provides a massager comprising: a housing; a motor having an output shaft; a power transmission link operatively coupled to the output shaft of the motor and has a length direction along a long axis; a transmission component having a bottom fixedly coupled to the power transmission link, and two arms extending from the bottom; a massage sleeve disposed outside the housing; a massage sleeve holder engaging the massage sleeve, the massage sleeve holder comprising two fixation fins each extending away from the massage sleeve holder and connected to a respective one of the two arms of the transmission component; wherein the motor, the power transmission link and the transmission component are disposed inside the housing, wherein the output shaft of the motor rotates about a rotational axis perpendicular to the long axis, and wherein the massage sleeve (when in operation) is driven by the motor via the power transmission link and the transmission component to move linearly along the long axis relative to the housing. The power transmission link can be a synchronous belt, or a drive chain.

In some embodiments, the housing has an upper surface having two opposing elongated slots through which each of the fixation fins passes from an exterior side of the housing to an interior side of the housing.

In some embodiments, the massager includes two synchronous belt pulleys engaging the synchronous belt, one of the two synchronous belt pulleys coupled with an output shaft of the motor.

In some embodiments, the massager further includes two guide rods arranged along the long axis, the guide rods being slidably coupled with the transmission component.

In some embodiments, the massager further includes a press plate coupled with the bottom of the transmission component, wherein an upper portion of the power transmission link, e.g., a synchronous belt, is secured between the press plate and the bottom of the transmission component.

In some embodiments, the massager further includes a gripping part connected to the housing for holding by a user.

In some embodiments, the massager further includes a circuit board arranged inside the housing.

In some embodiments, the housing of the massager has an upper surface forming a recessed region on an exterior side that is generally U-shaped in its cross-section perpendicular to the long axis, and the massage sleeve is arranged in the recessed region.

In another aspect, the present invention provides a massager, comprising: a motor; a transmission component operatively coupled with the motor; a massage sleeve configured to reciprocate along a long axis driven by the motor via the transmission component; a housing defining an internal accommodating space wherein the motor and the transmission component are disposed; the housing having an upper surface forming a recessed region on an exterior side of the housing that is generally U-shaped in a cross-section perpendicular to the long axis, wherein the massage sleeve is disposed in the recessed region and connected to the transmission component via a massage sleeve holder engaging the massage sleeve. The motor can have an output shaft rotatable about a rotating axis perpendicular to the long axis. The massager can further include a power transmission link disposed in the internal accommodating space of the housing, the power transmission link operatively coupled to the output shaft of the motor and has a length direction along a long axis. The transmission component can include a bottom fixedly coupled to the synchronous belt, and two arms extending from the bottom and each connected to the massage sleeve holder. The massage sleeve holder can include two fixation fins each extending away from the massage sleeve holder and connected to one of the two arms of the transmission component. The housing can have an upper surface having two opposing elongated slots through which each of the fixation fins of the massage sleeve holder passes from an exterior side of the housing to an interior side of the housing. The power transmission link can be a synchronous belt, or a drive chain.

COMPONENTS IN THE FIGURES

Figure 1:
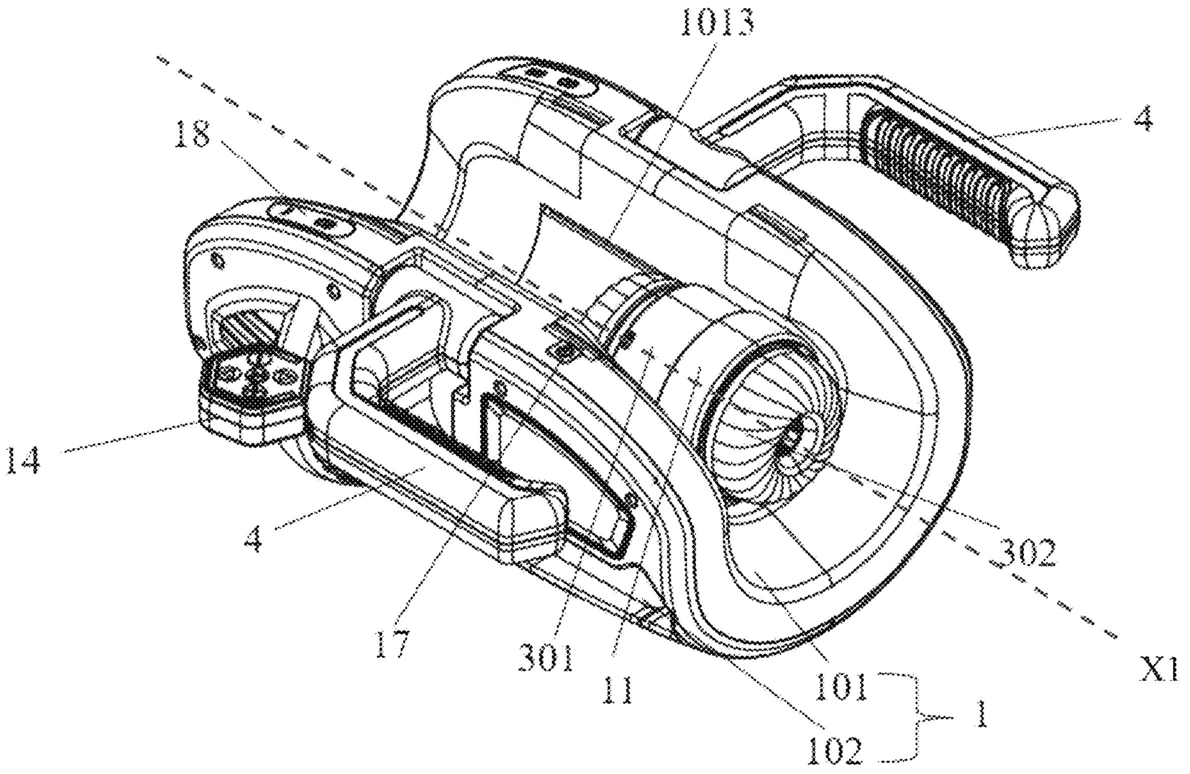
FIG. 1 is a perspective view of a massager according to embodiments of the present invention.

1. Housing; 2. Motor; 3. Massage sleeve; 4. Gripping part; 5. Synchronous belt; 6. First synchronous belt pulley; 7. Second synchronous belt pulley; 8. Guide rod 9. Transmission component; 10. Press plate; 11. Massage sleeve holder; 12. Control circuit board; 13. Fan; 14. Control unit; 15. Power source; 16. Guide rod fixture; 17. Power switch; 18. Display screen; 101. Upper housing 1011. First upper housing part; 1012. Second upper housing part; 1013. Slot; 102. Lower housing; 201. Motor shaft; 301. Massage cylinder 302. Elastic sleeve; 3021. Protrusions; 3022: Corrugation; 3023. Opening; 901/902. Tab

DETAILED DESCRIPTION OF EMBODIMENTS

Below, embodiments of the massager of the present invention are described with reference to the accompanying drawings. The elements and features described in one figure or embodiment of the massager can be combined with one or more elements and features shown in other figures or embodiments. For clarity, representations and descriptions of components known to those skilled in the art are omitted from the drawings and descriptions.

As shown in FIGS. 1-7, the massager includes a housing 1, gripping part 4 connected to the housing for holding by hand, a drive component that includes an electric motor 2 and synchronous belt 5 located inside the housing 1, and a massage sleeve 3 situated outside the housing 1. The massage sleeve 3 moves linearly back and forth along the long axis X1 relative to the housing 1 under the drive of the drive component.

The housing 1 in this embodiment is composed of an upper housing 101 and a lower housing 102, each having an interior side and an exterior side. The upper housing and lower housing together form an internal accommodating space that houses the drive/transmission components, power source, control circuit board, and other parts as will be further explained below. The upper housing 101 and lower housing 102 can be connected by a snap-fit or clamping mechanism, or any other method that ensures a secure connection.

Figure 2:
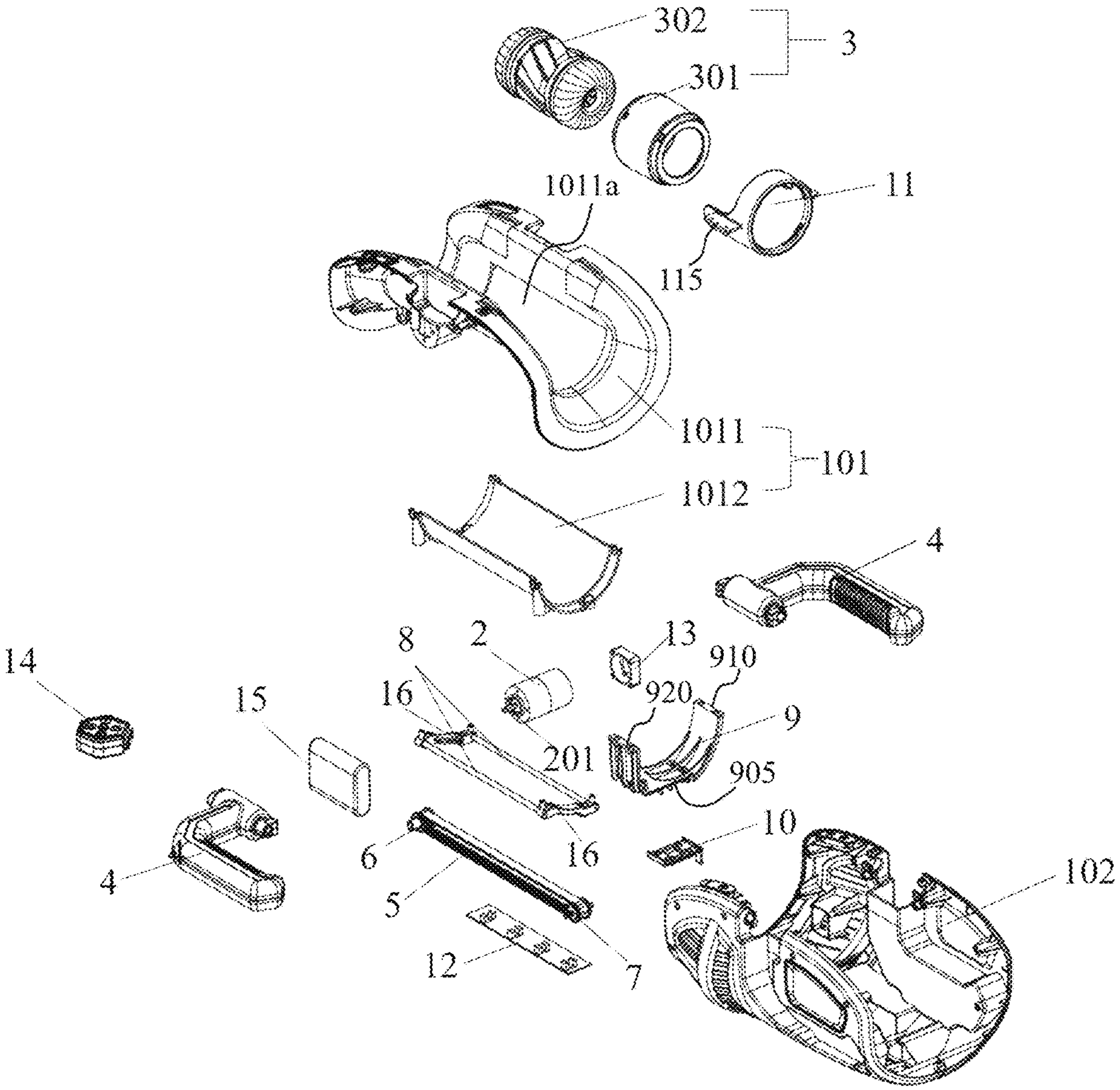
FIG. 2 is an exploded structural diagram of a massager according to embodiments of the present invention.
Figure 3:
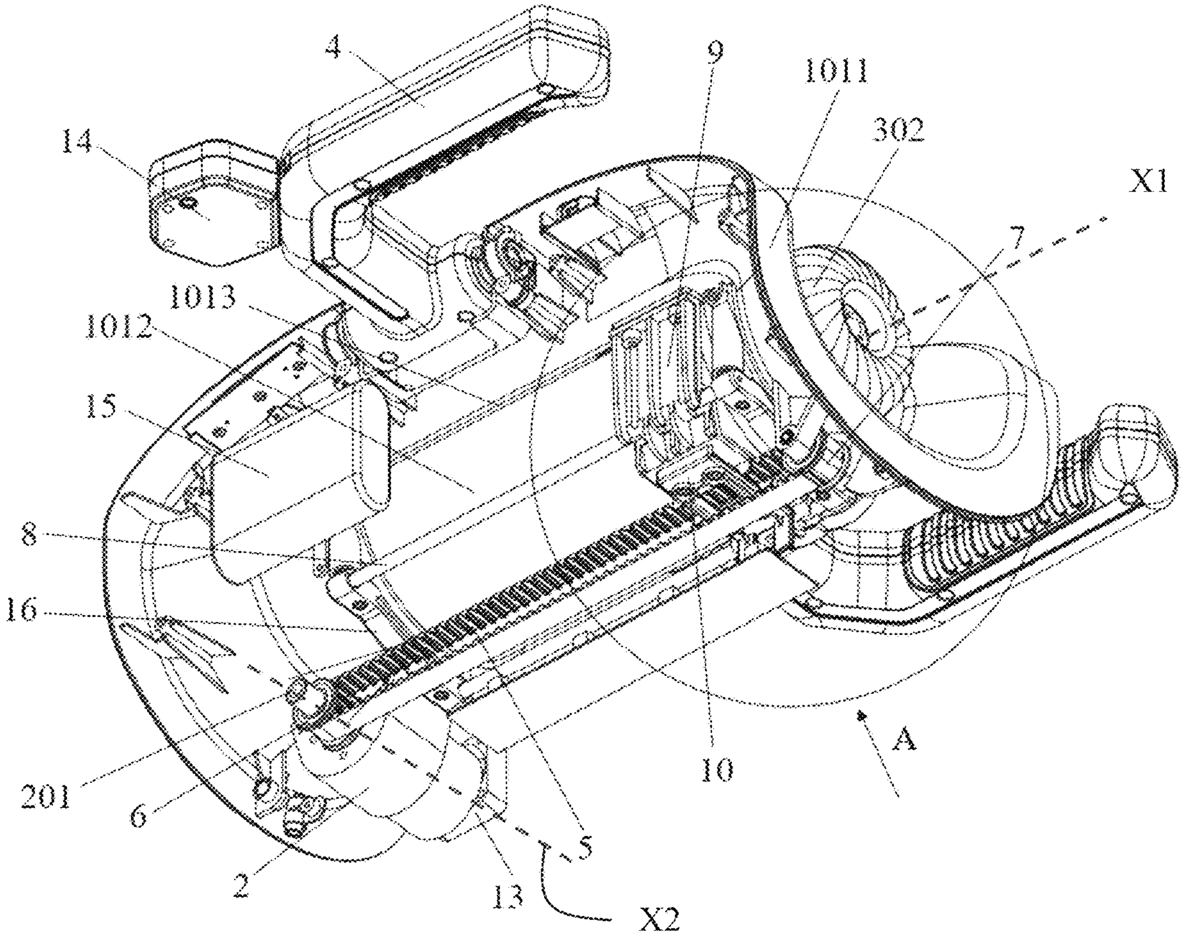
FIG. 3 is an internal perspective view of a massager according to embodiments of the present invention with the housing opened.
Figure 4:
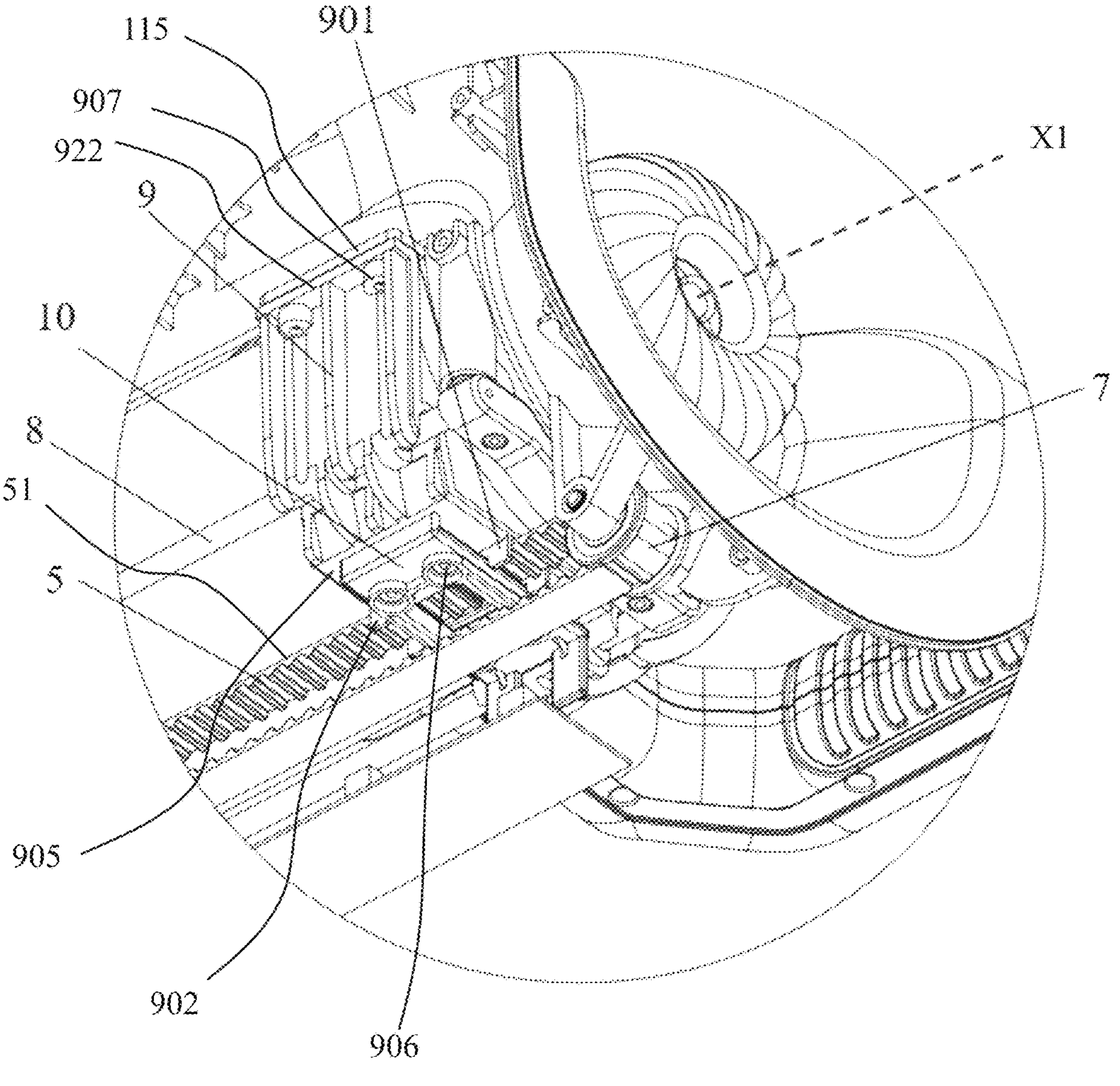
FIG. 4 is an enlarged view of part A in FIG. 3.
Figure 5:
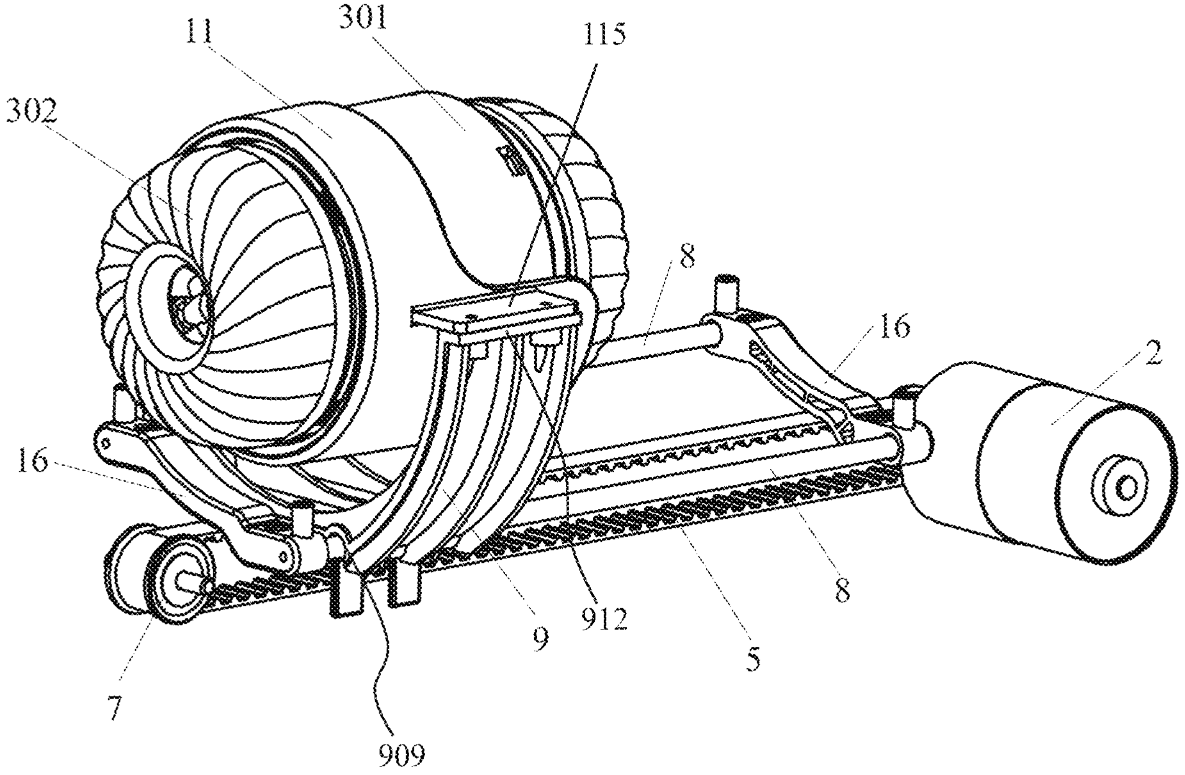
FIG. 5 is a perspective view of transmission related mechanism and massage sleeve of a massager according to embodiments of the present invention.
Figure 6:
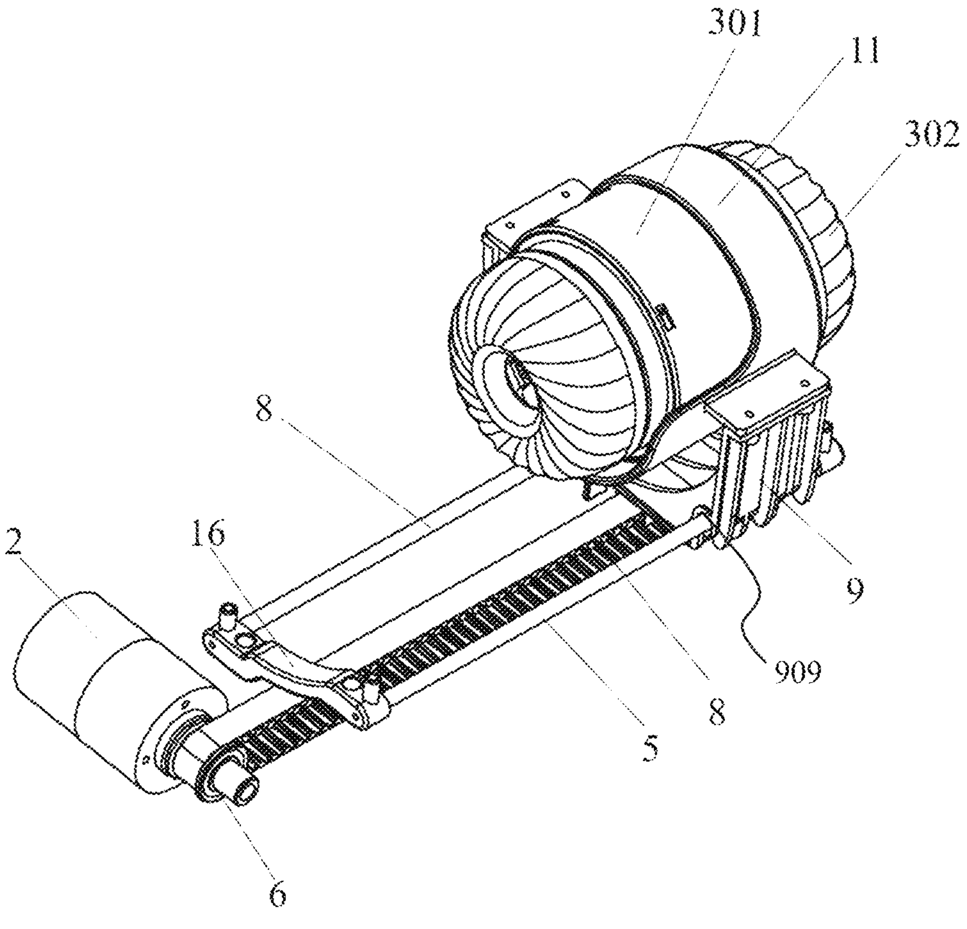
FIG. 6 is perspective view from another angle of the transmission related mechanism and massage sleeve of the massager shown in FIG. 5.

As shown in FIGS. 1 and 2, the housing 1 has an upper surface that takes a general U-shape in its cross-section (relative to the long axis X1), forming a recessed area or region above the upper housing 101 (on the exterior side of the housing). The massage sleeve 3 is positioned in the recessed region. The lower housing 102 can also take a general U-shape in its cross-section, as shown in the figures, so that the housing 1 overall can take the shape of a taco shell. The overall contour of the housing 1 can take other shapes as well, as long as it does not interfere with the movement of the massage sleeve 3.

The upper housing 101 comprises two parts: upper housing part 1 (1011), and upper housing part 2 (1012) having a concave shape in its cross-section. The upper housing part 1 (1011) has an inner void **1011*a* that can be filled by upper housing part 2 (1012). The upper housing part 2 (1012) can be slightly narrower than the width of inner void area of upper housing part 1 (1011) and slightly longer than the length (along the long axis) of the inner void area. The upper housing part 1 and upper housing part 2 are fitted together to substantially close the upper housing, but leaves narrow elongated slots 1013 (two slots, one on each lateral side of the massage sleeve 3, although only one is shown in the figures. each slot can have a narrow width, e.g., 1-3 mm) in the direction of the long axis which allows the fixation fin 115 to pass through, thereby connecting the massage sleeve 3 with the transmission and drive components disposed inside the housing, as further explained below. Upper housing part 2 (1012) can be attached at its two longitudinal ends to a bottom (interior) side of the upper housing part 1 (1011**), e.g., using frictional or snap-fitting by appropriately positioned mating components (e.g., using protrusions and holes).

The gripping part 4 can be symmetrically positioned on both sides of the housing 1, serving as handles. The gripping part 4 can be either fixed or movably connected to the housing 1. The angle between the gripping part 4 and housing 1 can be adjusted for comfortable holding. The connection method between the gripping part 4 and the housing 1 can also vary, allowing for multiple degrees of freedom similar to an arm's movement. The gripping part 4 can be designed to rotate around the front and back of the housing 1 or fold onto the lower housing 102, which can have a recessed region to accommodate the gripping part 4, thereby reducing the massager's volume and providing flexibility in its use. Additionally, the gripping part 4 can rotate 360 degrees along the housing's axial direction or slide up and down along the outer surface of the housing 1. It can also be designed for detachable connection with the housing 1 for easy assembly and disassembly. The shape of the gripping part 4 can be designed for ergonomic comfort, such as straight, L-shaped, C-shaped, D-shaped, or other shapes. L-shaped handles are shown in the figures.

As shown in FIGS. 2-7, the motor 2 drives the massage sleeve 3 to move in a reciprocating motion relative to the housing 1 through a synchronous belt transmission mechanism, which comprises a single synchronous belt 5, and two synchronous belt pulleys 6 and 7. The synchronous belt pulleys have teeth on their respective outer surfaces meshing with teeth of the interior side of the synchronous belt 5. The synchronous belt 5 has a length direction parallel to the long axis X1, and forms a complete loop. At any given moment, the synchronous belt 5 has an upper portion on top of the belt pulleys, a lower portion below the belt pulleys, and end turn portions wrapping around the outer surfaces of the two belt pulleys. The synchronous belt 5 has a length direction along the longitudinal axis X1.

The synchronous belt pulley 6 (the drive pulley) is connected to the motor shaft 201 of the motor 2, while synchronous belt pulley 7 (the driven pulley) is mounted on a support structure on an inner wall of the housing 1. Driven by the rotation of the output shaft 201 of the motor about the rotation axis X2 which is perpendicular to the long axis X1, the drive pulley 6 drives the synchronous belt to move along the long axis, which in turn drives the belt pulley 7 to move synchronously at the same speed. The synchronous belt 5 can be constructed of a flexible material that allows the synchronous belt to wrap around and move with the rotation of the belt pulleys smoothly. On its inner side, the synchronous belt 5 contains a series of parallel teeth 51 arranged along the long axis. These teeth on the synchronous belt mesh with the teeth on the outer surfaces of the belt pulleys 6 and 7. The upper part of the synchronous belt is secured between a top surface of a press plate 10 and the bottom of the transmission component 9.

The transmission component 9 can take an overall "U"-like cross-section shape and have two arms 910 and 920 extending from a bottom 905, which is attached to an upper surface of an upper portion of the synchronous belt 5. The bottom 905 also includes two tabs 901 and 902 extending downward. There are also two additional tabs on the other side of the synchronous belt (not shown) symmetrically arranged with respect to the synchronous belt (corresponding to the tabs 901/902). These tabs are spaced to tightly fit the synchronous belt 5 on its width direction, and also match the width of the press plate 10. The press plate 10 is positioned to engage the inner side of the synchronous belt 5, and its lateral side ends are fixated at the bottom 905 of the transmission component 9, e.g., by screws 906. This configuration allows tight securement of the synchronous belt 5 between the press plate 10 and the bottom 905 of the transmission component 9, ensuring no relative movement between these components.

To improve the stability of the reciprocating motion of the massage sleeve, two guide rods 8 are provided inside the housing parallel to the moving direction of the synchronous belt 5 (along the long axis). Each side of the transmission component 9 at the outer bent portion between the bottom and the side arm includes a longitudinal channel 909 that allows the transmission component 9 to slide along the guide rods 8. Both ends of the guide rods 8 are fixed to the inner wall of upper housing part 2 (1012) using guide rod fixture 16.

Figure 7:
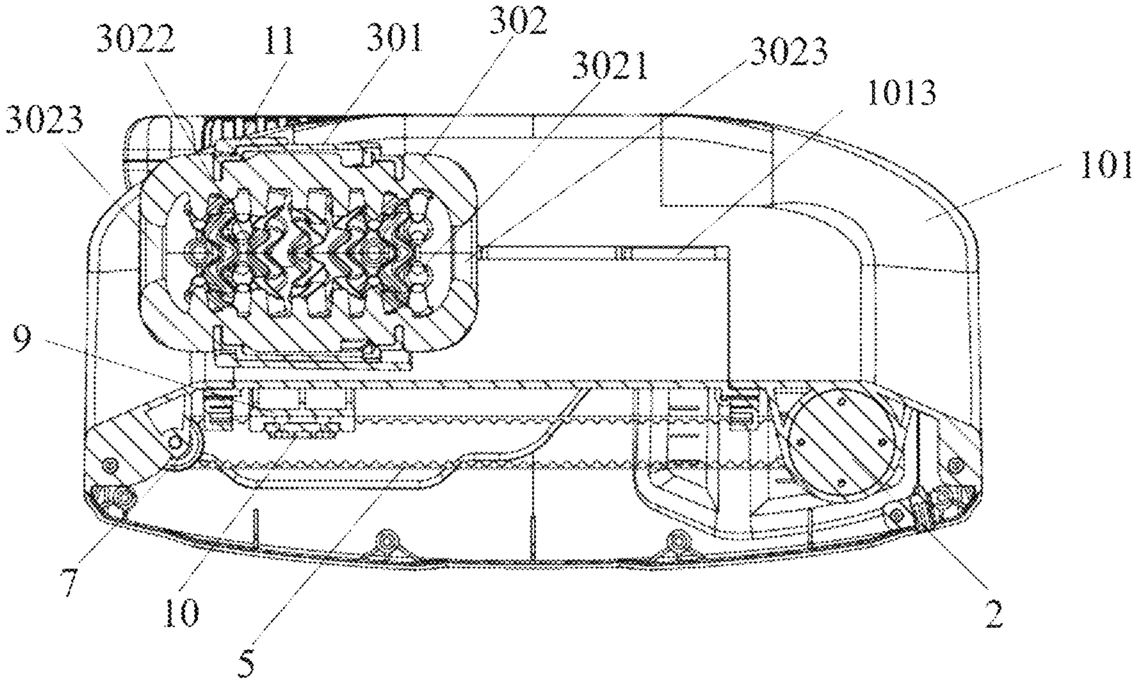
FIG. 7 is a cross-sectional view along the axial direction of the massage sleeve of the massager according to embodiments of the present invention.

As shown in FIGS. 2 and 7, the massage sleeve 3 has openings at both ends, and can include a massage cylinder 301 and an elastic sleeve 302 protruding outside of the massage cylinder 301 on both ends. The elastic sleeve 302 can include corrugated inner surfaces 3022 and granular protrusions 3021 to enhance stimulation. The elastic sleeve 302 can be made of modified plastic, rubber, silicone, or other elastic materials, with silicone being preferred for its flexibility, skin-friendliness, high mechanical strength, and durability, making it suitable for contact with a body part, e.g., a penis.

As shown in FIGS. 2, 4, 5, and 6, the massage sleeve 3 is fitted with a massage sleeve holder (in the form of a cylindrical hoop) 11, which can include two fixation fins 115 on both lateral sides, which pass through the respective slots 1013 and fixed to a top plate 912/922 of the transmission component 9, e.g., with bolt/nut 907. In this way, only a part of the fins (proximal end) of the holder 11 is visible to the user, and the remaining part is hidden from view below the upper housing. While it is shown that the two fins 115 are arranged on opposing outer surface of the massage sleeve holder and are parallel to each other, they can be arranged on other parts of the massage sleeve holder, or in different angles. To facilitate cleaning or replacing the massage sleeve 3, the massage sleeve 3 can be configured to be detachable from the massage sleeve holder 11, using a snap-fit or clamping mechanism.

When the motor 2 is activated and operational, the rotation of its output shaft 201 drives the synchronous belt pulley 6, which drives the synchronous belt 5 to move back and forth along the long axis, which in turn drives the massage sleeve 3 to move back and forth along the long axis. The length of the synchronous belt 5 determines the maximum stroke of the massage sleeve.

The motor 2 can be a brushless DC motor, which can change its rotation direction upon change of the direction of electric current, thereby achieving the reciprocating motion of the massage sleeve 3 along the long axis. The control and operation of the brushless DC motor is known in the art. The motor 2 can be powered by either an internal or external power source, which can be a rechargeable battery or a disposable battery. For example, as shown in the figures, the power source 15 can be a rechargeable battery located inside the housing 1.

The massager also includes a fan 13 located inside the housing 1 and connected to the power source 15. It can be used to cool the motor 2.

The massager also includes a control circuit board 12 connected to both the power source 15 and the motor 2. The control circuit board 12 is housed inside the housing 1 and is used to control the motor's speed and the movement range of the sleeve. A power switch 17 is also included to turn on and off the power for the motor and various control components.

The massager also includes a control unit 14, which can be wirelessly or wiredly connected to the control circuit board 12. The control unit 14 can be detachably mounted on the gripping part 4 or elsewhere on the housing. It can include various function buttons or switches for user input to adjust the speed and movement range of the sleeve.

The housing also includes a display screen 18, which can show information such as the moving speed of the massage sleeve and battery level.

While a synchronous belt (and associated belt pulleys) is used hereinabove as an exemplary power transmission link to transmit power from the motor to the massager sleeve, other forms of power transmission link can also be used, e.g., a drive chain, which can include a plurality of interconnected chain units coupled to drive and driven sprockets. The connection/coupling between the drive chain to other components of the massager are similar to what has been described with respect to the synchronous belt mechanism.

Although the invention and its advantages have been described in detail, it should be understood that various changes, substitutions, and modifications can be made without departing from the spirit and scope of the invention as defined by the appended claims. The scope of this application is not limited to the specific embodiments described in the specification. It will be readily understood by those skilled in the art from the disclosure that processes, apparatus, means, methods, or steps that perform substantially the same functions or achieve substantially the same results as those described in the corresponding embodiments herein can be used in accordance with the invention. Therefore, the appended claims are intended to cover such processes, apparatus, means, methods, or steps within their scope.

The invention claimed is:

1. A massager comprising:

a housing;

a motor having an output shaft;

a power transmission link operatively coupled to the output shaft of the motor and has a length direction along a long axis;

a transmission component having a bottom fixedly coupled to the power transmission link, and two arms extending from the bottom;

a massage sleeve disposed outside the housing; and a massage sleeve holder engaging the massage sleeve, the massage sleeve holder comprising two fixation fins each extending away from the massage sleeve holder and connected to a respective one of the two arms of the transmission component;

wherein the motor, the power transmission link and the transmission component are disposed inside the housing, wherein the output shaft of the motor rotates about a rotational axis perpendicular to the long axis, and wherein the massage sleeve is driven by the motor via the power transmission link and the transmission component to move linearly along the long axis relative to the housing, wherein the housing has an upper surface having two opposing elongated slots through which each of the fixation fins passes from an exterior side of the housing to an interior side of the housing.

2. The massager according to claim 1, wherein the power transmission link is a synchronous belt.

3. The massager according to claim 1, wherein the power transmission link is a drive chain.

4. The massager according to claim 2, further comprising a drive pulley and driven pulley respectively engaging the synchronous belt, the drive pulley coupled with the output shaft of the motor.

5. The massager according to claim 1, further comprising: two guide rods arranged along the long axis, the guide rods being slidably coupled with the transmission component, each of the guide rods having two ends being fixed to an inner wall of the housing.

6. The massager according to claim 1, further comprising:

a press plate coupled with the bottom of the transmission component, wherein an upper portion of the power transmission link is secured between the press plate and the bottom of the transmission component.

7. The massager according to claim 1, further comprising: a gripping part connected to the housing for holding by a user.

8. The massager according to claim 1, further comprising: a control circuit board arranged inside the housing.

9. The massager according to claim 1, wherein the housing has an upper surface forming a recessed region on an exterior side that is generally U-shaped in its cross-section perpendicular to the long axis, and the massage sleeve is arranged in the recessed region.

10. A massager comprising:

a motor, a transmission component operatively coupled with the motor;

a massage sleeve configured to reciprocate along a long axis driven by the motor via the transmission component;

a housing defining an internal accommodating space wherein the motor and the transmission component are disposed, the housing having an upper surface forming a recessed region on an exterior side of the housing that is generally U-shaped in a cross-section perpendicular to the long axis, wherein the massage sleeve is disposed in the recessed region and connected to the transmission component via a massage sleeve holder engaging the massage sleeve, wherein the motor has an output shaft rotatable about a rotating axis perpendicular to the long axis, the massager further comprising a power transmission link disposed in the internal accommodating space of the housing, the power transmission link operatively coupled to the output shaft of the motor and has a length direction along the long axis, wherein the transmission component includes a bottom fixedly coupled to the power transmission link, and two arms each connected to the massage sleeve holder, wherein the massage sleeve holder comprises two fixation fins each extending away from the massage sleeve holder and coupled to one of the arms of the transmission component, and wherein the housing has an upper surface having two opposing elongated slots through which each of the fixation fins of the massage sleeve holder passes from an exterior side of the housing to an interior side of the housing.

11. The massager of claim 10, wherein the power transmission link is a synchronous belt.

12. The massager of claim 10, wherein the power transmission link is a drive chain.

* * * * *